United States Patent [19]

Andresen

[11] Patent Number: 4,794,581
[45] Date of Patent: Dec. 27, 1988

[54] LENS SUPPORT SYSTEM ENABLING FOCUSSING AND TRACKING MOTIONS EMPLOYING A UNITARY LENS HOLDER

[75] Inventor: Rolf Andresen, Tucson, Ariz.

[73] Assignee: International Business Machines Corporation, Armonk, N.Y.

[21] Appl. No.: 66,380

[22] Filed: Jun. 25, 1987

[51] Int. Cl.[4] ............................................. G11B 7/09
[52] U.S. Cl. ........................................ 369/45; 369/44; 350/247; 350/255
[58] Field of Search .................... 369/44–46; 350/247, 252, 255; 358/342; 360/106, 109, 114

[56] References Cited

U.S. PATENT DOCUMENTS

| | | | |
|---|---|---|---|
| 3,526,726 | 9/1970 | Corbett et al. | 360/76 |
| 4,099,211 | 7/1978 | Hathaway | 360/109 |
| 4,143,405 | 3/1979 | Kubota | 360/77 X |
| 4,212,043 | 7/1980 | Baker | 360/104 |
| 4,258,398 | 3/1981 | Bixby et al. | 360/76 |
| 4,385,373 | 5/1983 | Howe | 369/45 |
| 4,392,163 | 7/1983 | Rijckaert et al. | 360/76 |
| 4,441,128 | 4/1984 | Ohba et al. | 360/75 |
| 4,475,179 | 10/1984 | Geyer | 365/215 |
| 4,562,562 | 12/1985 | Moriya et al. | 369/32 |
| 4,574,369 | 3/1986 | Koide et al. | 369/44 |
| 4,596,448 | 6/1986 | Kikuchi | 350/255 X |
| 4,613,355 | 10/1986 | Kasahara | 369/45 |
| 4,633,456 | 12/1986 | Luecke | 369/45 |
| 4,646,283 | 2/1987 | Ito et al. | 369/45 X |
| 4,661,943 | 4/1987 | Ikeda | 369/44 |
| 4,669,823 | 6/1987 | Iguma et al. | 350/255 |
| 4,679,904 | 7/1987 | Kurihara | 369/44 X |
| 4,702,555 | 10/1987 | Iguma et al. | 369/45 X |
| 4,720,088 | 1/1988 | Tamura | 369/44 X |

OTHER PUBLICATIONS

European Patent Application No. 0122816, 10/84, Fujii et al., Abstract and FIG. 2.
European Patent Application No. 0153459, 9/85, Luecke, Abstract and FIG. 2.
European Patent Application No. 0137283, 4/85, Kasahara, Abstract and FIGS. 9, 13, 14.
European Patent Application No. 0053476, 6/82, Ohnuki, Abstract, Figure and Claim 1.
PCT Document No. WO 84/04841, 12/84, Ito et al., Abstract, Figure and FIGS. 1–2.

Primary Examiner—Robert L. Richardson
Assistant Examiner—W. R. Young
Attorney, Agent, or Firm—H. F. Somermeyer

[57] ABSTRACT

A focus and tracking support includes a pair of bender beams extending parallel to a track to be scanned. The bender beams are cantilevered from a mounting block carried by a head carriage. Disposed intermediate and pivotally secured to the distal ends of the bender beams is a lens holder having two pairs of oppositely-extending, pivotally-secured support arms connected to the distal ends. The arrangement is such that when the bender beams are moved in the same direction tracking functions are performed while when the bender beams are moved in opposing directions, focussing functions are performed. The arms and lens holder are formed from a plastic unitary member. When the bender beams are piezo-electric beams, electrical signals for focus and tracking controls are superposed for effecting simultaneous focus and tracking functions.

10 Claims, 2 Drawing Sheets

LENS SUPPORT SYSTEM ENABLING FOCUSSING AND TRACKING MOTIONS EMPLOYING A UNITARY LENS HOLDER

BACKGROUND OF THE INVENTION

1. Field of the Invention

The field of the invention relates to optical recording systems, particularly focus and tracking apparatus usable with such recorders.

2. Discussion of the Prior Art

Every optical recorder that employs elongated record tracks, whether in raster or in concentric-circular form requires the functions of focussing the optics through an objective lens to the medium and for track following and seeking. These combined actions ensure that a light beam from the optics of the recorder is faithfully focussed and aligned with the record track being scanned or to be scanned. Typically, an objective lens is moved or tilted for providing the track-following functions as well as for so-called short seeks; that is, movement of the beam from a track currently being scanned to a track within fifty tracks of the current track. For achieving both focus and tracking functions within a single objective lens support requires that the lens support provide two degrees freedom. A first degree of freedom is along the axis of the objective lens for focussing the lens to the record medium. The second degree of freedom is in a direction orthogonal to the longitudinal extent of the track being followed. Such compound motions require actuators for moving the objective lens along the two degrees of freedom. Both magnetic coils and piezo-electric actuators have been employed for these mounts. An example of magnetic actuators for such two axis control is shown in U.S. Pat. Nos. 4,574,369 and 4,562,562 (FIG. 3). U.S. Pat. No. 4,143,402 shows a piezo-electric magnetic head control and support mechanism using two parallel piezo-electric-bender arms which are cantilevered from a support. The support contains the electrical connections to the piezo-electric arms. The magnetic head is moved in along one degree of freedom, i.e., transfers to the track being scanned.

Several configurations have been proposed and used for supporting either magnetic or optical transducers at the distal ends of cantilevered bendable piezo-electric support arms. An example of a four-arm support is shown in U.S. Pat. No. 4,475,179. An objective lens assembly is mounted between the distal ends of the four-cantilevered piezo-electric arms which respectively form a corner of a rectangle defined by the objective lens mount. A pair of the cantilevered piezo-electric arms disposed on one side of the objective lens optical axis cooperate to move the lens mount toward and away from a record medium. The pair of cantilevered piezo-electric arms on the side opposite of the optical axis to the first pair of such arms are disposed to actuate the lens holder orthogonally to the axis of the objective lens, i.e., for tracking and short seeks. Therefore, two of the arms provide for focus while two of the other arms provide for tracking and short seeks. This arrangement requires that each of the cantilevered piezo-electric arms be flexible along two axes along the lengths of the arms. The normal axis of the bending due to the internal piezo-electric forces and in the direction orthogonal to such normal bending action is found in known piezo-electric bending arms. A simpler arrangement is desired.

U.S. Pat. No. 4,616,355 teaches that piezo-electric bender supports, such as shown in FIGS. 4 through 8 of that patent, have difficulty with mechanical resonances induced into the assembly because of the piezo-electric bender arms. Examination of FIGS. 4-8 show a complex arrangement wherein the lens holder is supported through a pair of upstanding studs. Two sets of piezo-electric parallelogram-arranged arms are disposed between the studs and the lens holder such that the distal ends of the piezo-electric parallel arm assemblies support the lens respectively at one corner and at a center of one side of the holder. This arrangement appears to result in focus changes whenever tracking changes are made and tracking changes whenever focus changes are made. The patent further teaches that a magnetic actuator arrangement using two sets of parallelogram-oriented supports be employed. A pair of opposing upstanding frame supports support the outward ends of the dual parallelogram arrangements. The inner portion of the parallelogram arrangements support respective oppositely-facing sides of a lens holder. Coils for actuating the lens for tracking and focussing found in the lens holder itself provides magnetic forces which cause motion along the axis of the lens and transverse to the axis of the lens by flexing the support assembly at predetermined junctures between rigid arms. Again, it is desired to avoid such a complex and expensive holder arrangement.

U.S. Pat. No. 4,385,373 provides for a plurality of independently addressable piezo-electric bender elements for supporting a lens in an optical system. The bender elements are distorted along their lengths for pivoting the axis of the lens for performing tracking functions. The patent teaches that it is preferred to have four piezo-electric bender elements such as shown in FIGS. 7 and 8 which are coupled to a lens holder at the respective corners thereof. A similar arrangement is desired.

U.S. Pat. No. 4,441,128 shows a magnetic head support having two parallel bimorph bender elements supporting same. The head element is supported at the distal end of the bimorphs in such a way that the movement of the head along one degree of freedom is always along a straight line. Bimorphs are always maintained parallel to keep the head from turning or twisting. Two axes of motion are desired.

U.S. Pat. No. 4,258,398 shows another magnetic head support using two piezo-electric cantilevered bender beams. The beams are designed to flex in the direction of the track being scanned. They are spaced apart transversely to the track direction. The beams can be bent in opposite directions for adapting the orientation of the supported head for skew with respect to a plurality of tracks on a tape being scanned. Sum and difference error derived control signals actuate the cantilevered piezo-electric bender beams accommodating the skew. No tracking or track seeking functions are performed.

SUMMARY OF THE INVENTION

It is an object of the present invention to provide a low-cost simple support for an objective lens in an optical data recorder that provides for both focus and track following and seeking functions. In a preferred form of the invention, the support consists of a single-molded lens support disposed intermediate two cantilevered, piezo-electric bender beams and arranged such that when both bender beams move in the same direction, a tracking function is performed while when the bender beams move in opposing directions a focus function is performed. Control signals are superposed on the bender beams for simultaneous focus and tracking functions.

In a specific form of the invention, two sets of flexible parallel arms connect the respective bender beams to opposite-facing sides of the lens support. The sets of parallel arms are disposed at an acute angle with respect to bender beams.

In a focus and tracking support for a lens disposed between the distal ends of a pair of flexible bender beams, a force for bending the beams either in parallelism or in opposing directions is applied at or near the base support for the cantilever. A set of parallel arms and a body supporting the lens are preferably molded as a unitary member.

The foregoing and other objects, features, and advantages of the invention will be apparent from the following more particular description of preferred embodiments of the invention, as illustrated in the accompaning drawings.

BRIEF DESCRIPTION OF THE DRAWINGS

FIG. 4 is a simplified schematic diagram showing a control circuit for operating the FIGS. 2 and 3-illustrated support achieving simultaneous focus and tracking functions with the illustrated apparatus.

DETAILED DESCRIPTION

Figure 1:
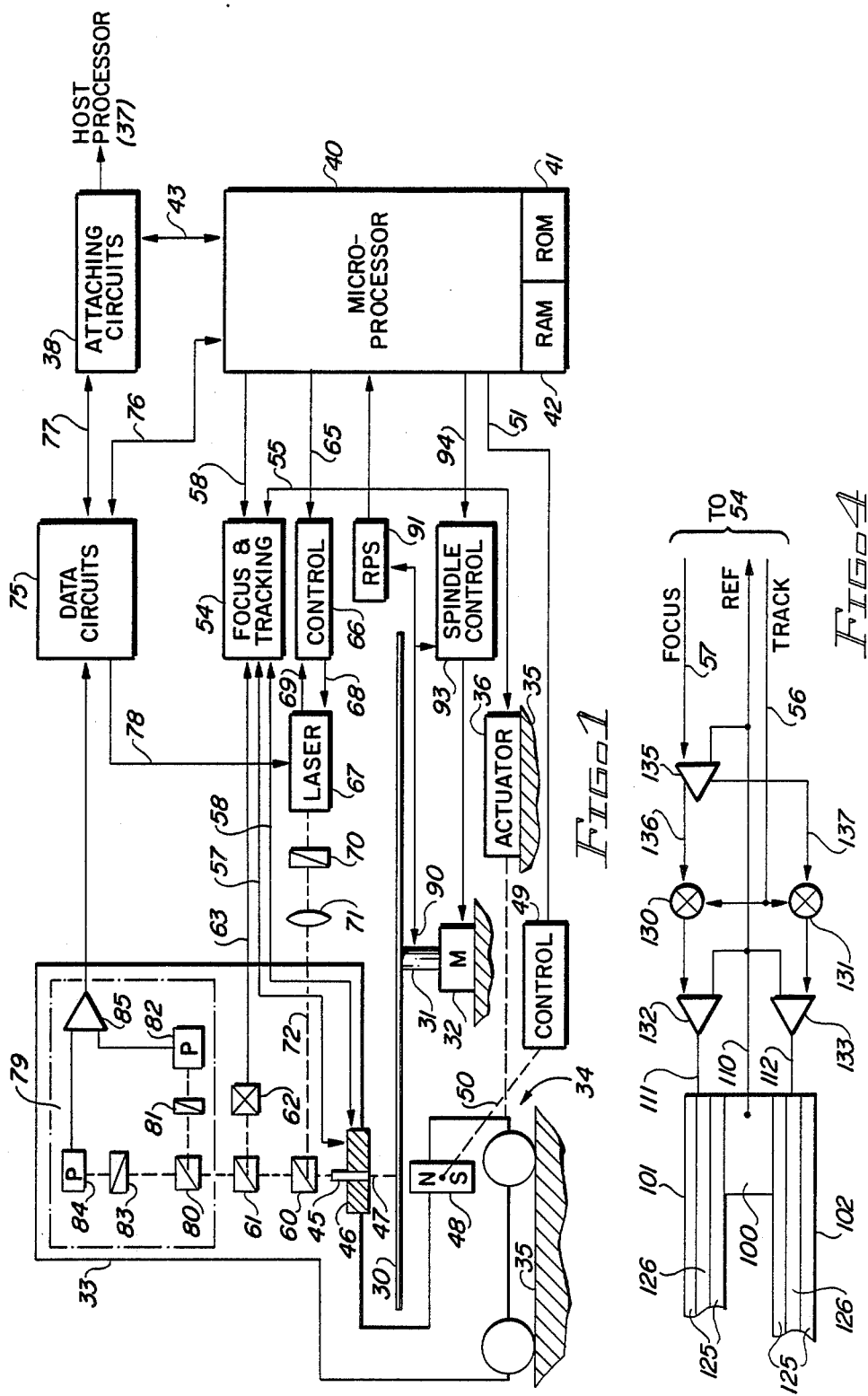
FIG. 1 is a block diagrammatic showing of a magnetooptic data recorder with which the present invention may be advantageously employed.

An optical recorder with which the present invention may be advantageously employed is shown in FIG. 1. A magnetooptic record disk 30 is mounted for rotation on spindle 31 by motor 32. Optical head-carrying arm 33 on head arm carriage, generally denoted by numeral 34, moves radially of disk 30. A frame 35 of the recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 is suitably mounted on frame 35, radially moves carriage 34 for enabling the track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing and track following and seeking movements radially of disk 30; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 provides a weak magnetic steering field for directing the remnant magnetization direction of a small spot on disk 30 illuminated by laser light from lens 46. The laser light spot heats the illuminate spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 rotates so the south pole is adjacent disk 30. Magnet 48 control 49 which is mechanically coupled to rotatable magnet 48 as indicated by dashed line 50, controls the write and erase directions. An electric coil may replace magnet 48. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 36. The positioning of carriage 34 by actuator 36 is precisely controlled by control signals supplied by circuits 54 over line 55 to actuator 36. Additionally, the actuator control by circuits 54 is exercised by control signals travelling over lines 57 and 58, respectively, for focus and fine tracking and switching actions of fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. The symbol 62 also includes optics, such as a hemicylinder lens, for processing a light beam before the beam impinges on the detector surfaces. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 70 toward half mirror 60 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75 also ancillary circuits (not shown) relating to disk 30 format signals, error detection and correction signals and the like. Circuits 75, during a read or recovery, detection or correction strip the ancillary signals from the readback signals before supply corrected data signals over bus 77 to host processor 37 via attachment 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (iigital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to conrrol 93 in the usual manner.

Figure 2:
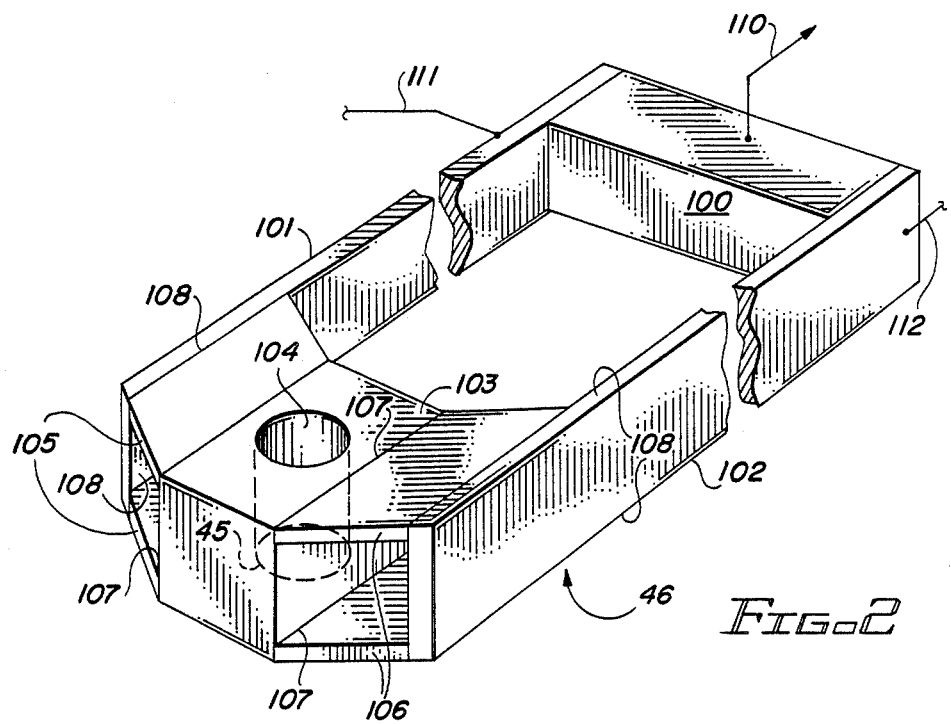
FIG. 2 is a diagrammatic isometric view of the lens support constructed in accordance with the present invention.
Figure 3:
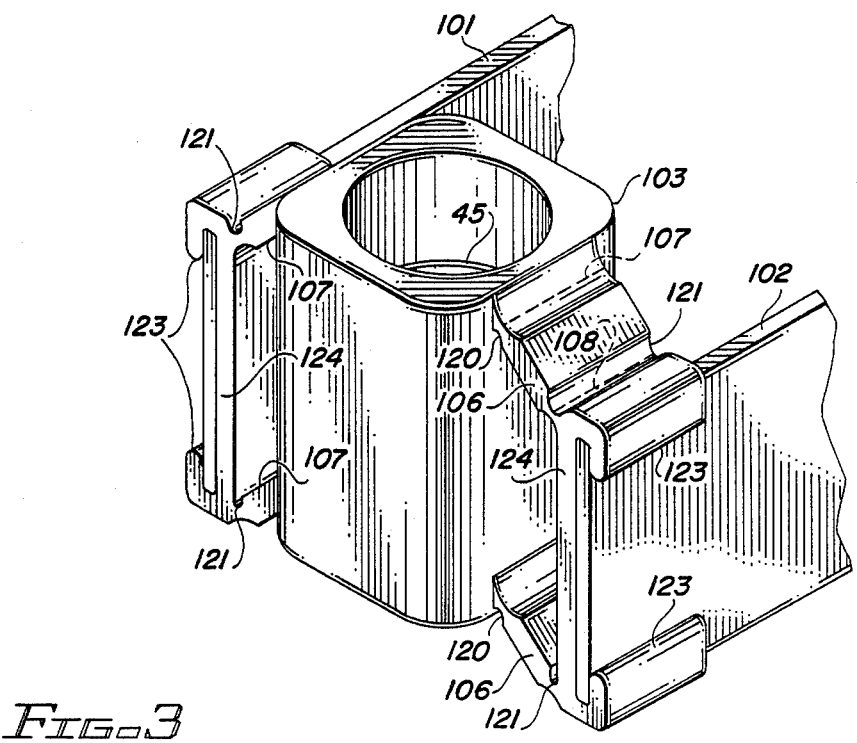
FIG. 3 is an abbreviated isometric showing of a portion of the support which includes a unitary lens-holding element with flexible attached parallel-extending arms for attaching to a pair of bender beams.

Lens support 46 is best seen in FIGS. 2 and 3. A mounting block 100 suitably affixed to the distal end of arm 33 such that the objective lens 45 faces record medium 30. Cantilevered from opposite sides of mounting block 100 is a pair of cantilevered piezo-electric bender beams 101 and 102. The bender beams may have an outer coating which is electrically conductive for inducing electric fields in piezo-electric material contained within the beam. Mounting block 100 is preferably conductive as well and is in electrical contact with the inward-facing surfaces of the bender beams 101, 102. Disposed intermediate the distal ends of bender beams 101, 102 is a unitary lens holder 103 having an aperture 104 for supporting objective lens 45. The light path extends through aperture 104 (shown in FIG. 1 as light path 47). Disposed respectively between bender beams 101, 102 and lens holder 103 are two pair of parallel resilient support arms 105 and 106; arms 105 pivotably connect to the longitudinal edges of bender beam 101 to the upper and lower edges of holder 103 while arms 106 support the opposite side of holder 103 from the longitudinal edges of bender beam 102. The arrangement is such that four pivot lines 108 are formed between the respective bender beams 101, 102 and the pairs of support arms 105, 106. Similarly, at the juncture of the arms 105, 106 and the lens holder 103 are pivot lines 107. Cantilevered arms 101, 102 extend along the length of the track beam scanned.

When bender beams 101 and 102 both bend to the left as seen in FIG. 2 a first track seeking or following function is performed. Whereas, when the beams 101, 102 both bend to the right as shown in FIG. 2, a second tracking or track seeking function is performed. Simultaneous to either tracking function, bender beams 101, 102 may be bent slightly apart or slightly toward each other. When the bender beams bend slightly toward each other as seen in FIG. 2, lens holder 103 moves toward the medium 30 for a first focus function. Contrarily when bender beams 101, 102 move apart, then lens holder 103 moves upwardly as shown in FIG. 2 for performing a second focus function.

When the bender beams 101, 102 are piezo-electric in nature, a ground reference potential or other reference potential is applied to mounting block 100 and inner conductive coatings of the bender beams 101, 102 through electrical lead 110. Actuating electrical potential applied to the outward-facing surface of bender beam 101 through electrical lead 111. Similarly, electrical lead 112 applies actuating potential to piezo-electric bender beam 102. Bender beams 101, 102 alternately may be magneticlly or mechanically actuated and still practice the present invention. The details of such alternate actuating is not relevant to an understanding of the invention.

FIG. 3 shows the preferred constructed embodiment of the invention using a unitary member for both lens holder 103 and arms 106, 107. Len 45 is positioned such that light path 47 is upwardly rather than downwardly as shown in FIG. 1. For instance, when the bender beams 101, 102 bend toward each other then the lens 45 moves toward the record medium; the same focussing function explained with respect to FIG. 2. Contrarily, when beams 101, 102 bend apart, lens holder 103 and objective lens 45 move away from record medium 30, the first focussing function described with respect to FIG. 2. Each of the arms 106, 107 have a longitudinal-extending groove 120 integrally formed in the arm for creating four pivot lines 107 intermediate the lens holder 103 and the arms 106, 107. Similarly, each of the arms 106, 107 have a longitudinally-extending groove 121 forming four pivot axes 108 intermediate the arms and the bender beams 101, 102. The four pivot lines 108 or axes are respectively in each of the grooves 121. Integrally formed with the arms 106, 107 is a retainer flap 123 which receives the distal ends of bender beam 101 and 102. Between the arms in each pair of arms is a web 124 extending between the retainer flaps 123. The bender beams 101, 102 may be adhesively secured to webs 124 and retainer flaps 123.

When the objective lens 45 is directing a light beam to the medium 30 which is in focus and on track, the arms 106, 107 should be at about a 45-degree angle with respect to the optical axis of lens 45. As the focus conditions change, the arms 106, 107 pivot about lines 107 and 108 for adjusting the position of lens holder 103 along the optical axis of lens 45. Arms 106 and 107 do not remain parallel in these operations. For tracking functions, the angular disposition of the arms 106 and 107 with respect to the optical axis of lens 45 is not changed.

Referring next to FIG. 4, it is seen that piezo-electric bender beams 101 and 102 have outer electrically conductive coatings 125. Inwardly facing ones of such coatings 125 are in snug electrical contact with mounting block 100 and connected via electrical lead 110 to a reference potential REF. Outwardly facing surface coatings 125 are respectively connected by electrical leads 111 and 112 for receiving electrical guidance signals as will become apparent. The inner layer 126 of the bender beams 101 and 102 consist of piezo-electric materials of known constituency. Multiple layers of the coatings and piezo-electric materials may be provided rather than simple tri-layer bender beams that are illustrated.

The tracking function is achieved by receiving a tracking control signal over line 56 from circuits 54. The tracking control signal is applied equally to analog summer circuits 130 and 131 which are respectively then applied through driver amplifiers 132 and 133 to bender beams 101 and 102. Focus controlling signal is received over line 57 from circuits 54. Differential amplifier 135 splits the signal into two equal portions of opposing electrical polarity and supplies a first portion over line 136 to summer 130 and a second portion over line 137 to summer 131. The analog summer circuits 130 and 131 combine the tracking and focus error control signals for controlling the bender beams 101 and 102 to simultaneously provide focus and tracking functions. It is to be understood that the signal amplitudes supplied for focus control and for tracking control balance using known in critical techniques. Generation of focus and tracking control signals are so well known a detailed description of such are dispensed with.

While the invention has been particularly shown and described with reference to preferred embodiments thereof, it will be understood by those skilled in the art that various changes in form and details may be made therein without departing from the spirit and scope of the invention.

What is claimed is:

1. A focussing and tracking support system for a lens in an optical record medium player for providing to an objective lens a first degree of freedom to and from a recording surface of a record medium along an axis perpendicular to the medium and a second degree of freedom in a direction transverse to record tracks on the medium; the improvement, including in combination:

a headarm movable orthogonally to the record tracks on the medium, a mounting block mounted on the headarm, first and second bender beams mounted on the mounting block on opposite faces thereof and extending from the mounting block in a direction along the length of a record track to be scanned on the record medium, said bender beams being spaced apart a predetermined distance;

a lens holder disposed intermediate the distal ends of said bender beams for carrying an objective lens having an optical axis orthogonal to the recording surface of said record medium; and two pairs of arms respectively pivotally secured to the bender beam long edges thereof bending parallel to the record track to be scanned and to the lens holder on pivot lines parallel to the longitudinal extent of the record track to be scanned.

2. The focussing and tracking support system set forth in claim 1, wherein said bender beams each include piezo-electric material disposed along the length thereof being responsive to electrical signals for making simultaneous bending motions for moving the distal ends of the beams closer together or further apart or moving the distal ends in a direction orthogonal to the length of the record track to be scanned on said arms extending between said lens holder and said distal ends accommodating all of said motions.

3. The focussing and tracking support system set forth in claim 2, wherein said lens holder and said arms are in a unitary member which further includes bender beam retaining flaps at the distal ends of said arms, each of the arms having a pair of grooves extending parallel to the bender beams at the respective opposite longitudinal ends thereof for forming said pivot lines.

4. The focus and tracking support system set forth in claim 2, further including electrical circuit means electrically connected to said piezo-electric bender beams for supplying superposed focus and tracking control signals to both of said beams, said focus control signal consisting of a differential signal having equal amplitude but of opposite polarity for the respective piezo-electric bender beams and the tracking signal having an identical signal applied to both of said piezo-electric bender beams.

5. The focus and tracking support system set forth in claim 1, further including, in combination:

said pairs of arms which respectively connect the distal ends of the bender beams to the lens mount are disposed at about 45 degrees with respect to an optical axis of a lens supported by the lens holder when the lens is pproviding a focussed spot to a record track beam scanned, the angle of said arms with respect to the optical axis changing for altering the focus condition and remain constant for maintaining the same angle of a current focus condition when the bender beams simultaneously bend for track following or track seeking lens motions.

6. A lens holder system for use in an optical record medium player comprising a unitary body having an aperture extending along an optical axis of a lens to be supported by the untiary body and having first and second oppositely-facing support surfaces, each surface having first and second end portions spaced along the optical axis of a lens to be supported, first and second support arms attached to a first of said oppositely-facing surfaces respectively at said first and second end portions and being disposed at a predetermined acute angle with respect to said support surfaces, a web joining the distal ends of said first and second arms, bender beam support flaps integrally formed at the juncture of said web and said first and second arms for holding a free distal end of a support beam;

third and fourth amrs disposed respectively at the first and second end portions of said second outwardly-facing support surface and extending at an acute angle with respect to said second support surface, a web joining the distal ends of said third and fourth support arms and having bender beam support means integrally formed with the web for retainingly receiving a distal end of a support beam, such support beam being disposed in a substantailly parallel relationship to the first-mentioned support beam; and each of the arms having a first necked-down portion extending parallel to the respective support surfaces and closely-spaced thereto for providing a first pivot line for each of the respective arms and a second mecked-down portion extending parallel to each of the first necked-down portions for forming a pivot line immediately adjacent the respective web.

7. The lens holder system set forth in claim 6, wherein each of said first neckeddown portions consists of a groove opening in a first direction along the optical axis and each of said second neckeddown portions consisting of a groove opening and facing an opposite direction along said optical axis, the lens holder system having an objective lens; and including in combination:

a mounting block being mounted upon a headarm having oppositely-facing support surfaces which are spaced apart and to be disposed along the length of a record track to be scanned;

first and second spaced apart bender beams mounted on the support surfaces of said block and extending away from the block in the same direction in a spaced relationship;

actuating means operatively associated with said bender beams for flexing said beams in a same direction or to flex in opposing directions including causing the bender beams to simulatneously bend in the same or opposing directions in differing degrees for achieving focussing and tracking functions simultaneously;

said lens holder unitary body being disoosed intermediate the distal ends of said bender beams with said two pairs of arms extending between the distal ends of said bender beams and said lens support in a parallelogram formed by the arms at about 45 degrees with respect to an optical axis of a lens to be supported; and each of said arms having a pivot connection to the bender beams and to the lens holder at respective ones of said necked-down portions.

8. The lens holder system set forth in claim 7, wherein both of said bender beams have a substantial width extending parallel to the optical axis of a lens to be supported and said arms being secured to said distal ends of said bender beams at the longitudinal edges of the distal ends, respectively.

9. The lens holder system set forth in claim 8, wherein said actuating means includes piezo-electric material disposed along the length of both of said bender beams and includes elecrrical contacts for receiving electrical signals causing the bender beams to flex simultaneously in either direction.

10. The lens holder system set forth in claim 8, wherein said actuating means includes control signal receiving means for receiving focus and tracking control signals, first and second analog summing circuits respectively electrically connected to said bender beams for supplying control signals thereto;

said control signal receiving means supplying a received tracking signal equally to said analog summer circuits and having means for supplying a focus control signal equally to the two summer circuits but with opposing polarities such that the two control signals are superposed for effecting simultaneous focus and tracking functions through flexture of said two bender beams.

* * * * *